June 19, 1956
C. R. VEGREN
2,751,238
QUICK ACTING CONNECTOR
Filed July 2, 1952
2 Sheets-Sheet 1
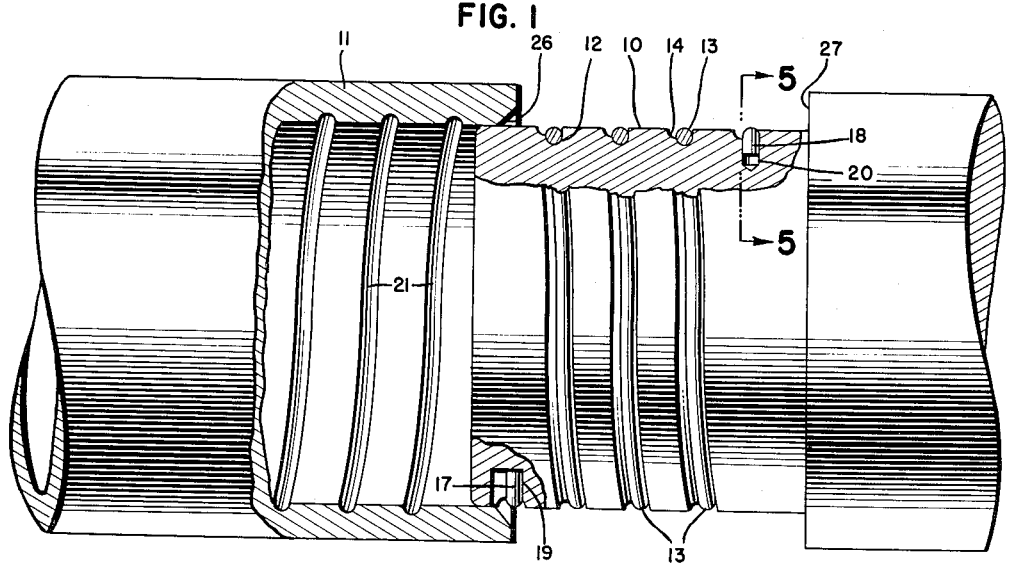
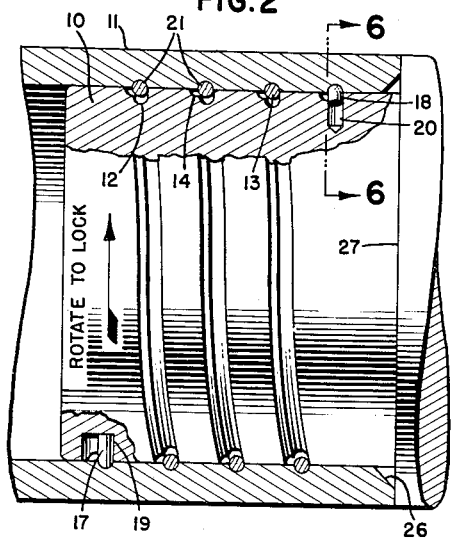
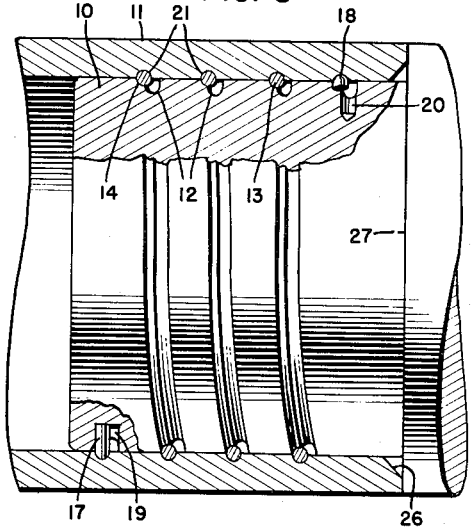
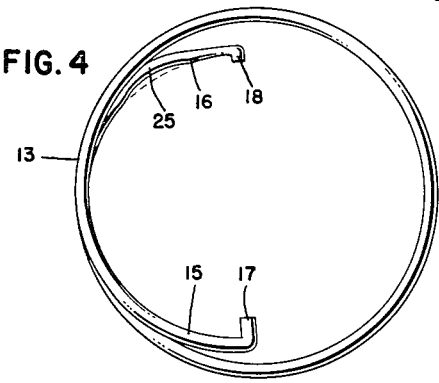
INVENTOR
CONRAD R. VEGREN
BY
ATTORNEYS June 19, 1956 C. R. VEGREN 2,751,238
QUICK ACTING CONNECTOR
Filed July 2, 1952 2 Sheets-Sheet 2

INVENTOR
CONRAD R. VEGREN
BY
ATTORNEYS

United States Patent Office 2,751,238
Patented June 19, 1956

2,751,238

QUICK ACTING CONNECTOR

Conrad R. Vegren, Washington, D. C.

Application July 2, 1952, Serial No. 296,982

8 Claims. (Cl. 287—119)

(Granted under Title 35, U. S. Code (1952), sec. 266)

The invention described herein may be manufactured and used by or for the Government of the United States of America for governmental purposes without the payment of any royalties thereon or therefor.

The present invention relates to a connector and more particularly to a high strength quick acting means for connecting mating parts which are to be joined and is a continuation-in-part of copending application Serial Number 267,900, filed January 23, 1952, now Patent No. 2,-665,931, issued January 12, 1954.

When mating parts of the above type are to be connected, it is frequently necessary that the parts be quickly attachable and that the connection be positive and safe to the extent that the mating members will not easily part during normal use. Means which have heretofore been used to connect such members have involved, among other things, the use of matching internal and external threads, detents, keys, and pins. Where large numbers of parts must be quickly assembled threaded connections are often unsuitable because of the time and labor required to secure the members together. The other methods of attachment enumerated above involve either a considerable waste of time in assembly or do not provide a sufficiently positive connection between members.

The present invention overcomes the disadvantages associated with prior art connecting means by providing a tensioned coil spring which, prior to joining of the parts, lies radially depressed in a spiral groove on a male member, the depth of the groove being substantially equal to or greater than the cross-sectional diameter of the spring wire. In addition to the first spiral groove there is provided on the male member adjacent thereto a second spiral groove having a depth less than the cross-sectional diameter of the spring wire. A female member is provided with an internal spiral groove complementary to those of the male member and having a depth less than the cross-sectional diameter of the spring wire. The arrangement may be such that when the members are joined and the first spiral groove on the male member is brought into registry with the complementary groove of the female member the coil spring expands into the latter thereby providing an effectively thread coupled joint. The coupling of the members may be tightened by rotating either one or the other in a manner common to any thread coupled joint in order to move the spring wire from the first spiral groove on the male member into the second spiral groove thereby precluding the possibility of the members parting by the action of an external force which might cause the spring wire to move radially inwardly out of contact with the spiral groove in the female member and effectuate an uncoupling of the members.

With the foregoing in mind it is an object of the present invention to provide an interlocking connector for male and female members.

Another object of the invention is to provide a connector of the above type which is automatically self-locking.

Another object of the invention is to provide a lock connection for male and female members which is both positive in operation and rapid in use.

Another object of the invention is to provide a high strength quick acting connector which is easily actuated.

Still another object is the provision of a permanent lock between members being joined.

Another object of the invention is to provide a spring wire coupling having means for preventing the disengagement of coupled members once they are assembled.

Other objects and many of the attendant advantages of this invention will be readily appreciated as the same becomes better understood by reference to the following detailed description when considered in connection with the accompanying drawings wherein:

Fig. 1 is a longitudinal view partly in section of one embodiment of the present invention;

Fig. 2 is a changed position view similar to Fig. 1 showing the male and female members in a first assembled position;

Fig. 3 is a changed position view similar to Fig. 1 showing the male and female members assembled and locked in position;

Fig. 4 is a slightly reduced transverse elevational view of a form of coil spring that may be employed in the present invention;

Figure 7:
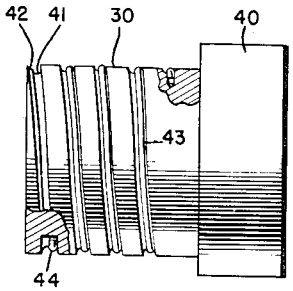
Fig. 7 is a reduced longitudinal view partly in section of a second embodiment of the present invention in which the grooves of the male member have been extended to the end thereof.
Figure 9:
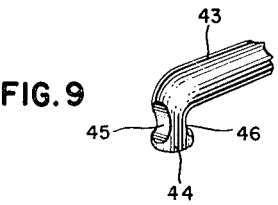
Figure 8:
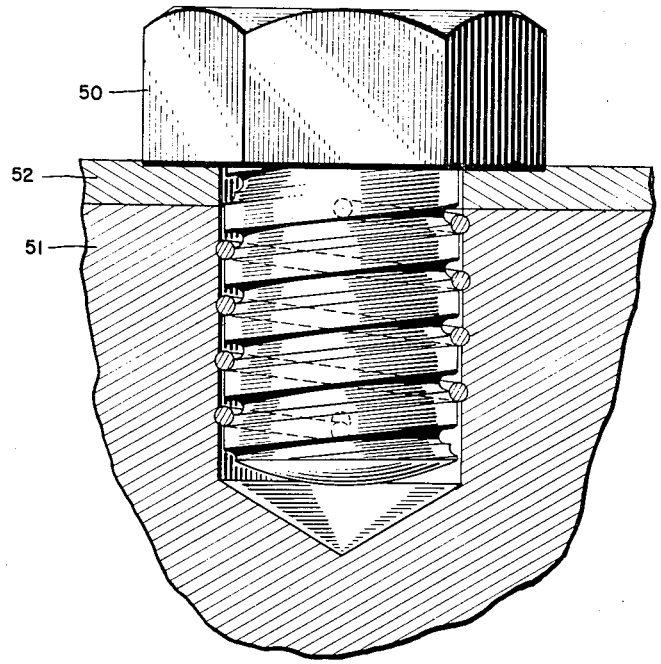

Fig. 8 is a longitudinal view partly in section of another embodiment of the present invention, similar to that of Fig. 7, in which a machine screw is shown connected with a threaded plate; and Fig. 9 is an enlarged perspective view of one of the coiled connector spring tangs which may be used in conjunction with the embodiments shown in Figs. 7 and 8 and which is notched in order to weaken it for removal.

Referring now to the drawings wherein like reference numerals designate like parts throughout the several views and more particularly to Fig. 1 wherein there is disclosed a coupling assembly which includes an externally grooved male connecting member 10 which is to be connected to an internally grooved female connecting member 11. The male member 10 has an external helical or spiral groove 12 machined therein which extends along the length of the member terminating short of the end thereof for accommodating a coiled connector spring 13 having a form illustrated in Fig. 4. In addition to the first spiral groove 12 there is provided on the male connecting member 10 a second groove 14 which lies adjacent to and coextensive with the first groove for accommodating the connector spring 13 after the members 10 and 11 are connected, to positively lock the members in an assembled condition (Fig. 3). The material of spring 13, although disclosed as circular in cross-section, may be of any desired cross-sectional configuration, such as for example, square or rectangular. The groove 12 is of a predetermined depth which is preferably equal to or greater than the diameter of the material of which the spring 13 is constructed and has a sectional configuration complementary to that of the spring material, so that when the spring is mounted in the groove about the member 10 the upper surface of the spring lies substantially flush with or below the outer surface of the member, thus presenting an effectively smooth surface relatively free from any obstruction that might impede the joining of the members 10 and 11. The spring 13, which in a normal expanded condition (Fig. 4) is of a larger external diameter than the major diameter of the groove in member 11, has ends 15 and 16 which are of a smaller arc radius than the intermediate convolutions of the spring and the arc radius of the male member. These ends 15 and 16 terminate in inwardly projecting spring retaining tangs 17 and 18, respectively, which serve as locking means to maintain the loops of the spring 13 within the confines of groove 12 by engaging suitable recesses 19 and 20 located at opposite ends of the groove. The recess 19 is elongated to extend across the grooves 12 and 14 and thereby permit the movement of spring 13 from groove 12 to groove 14. The tangs 17 and 18 are maintained within their respective recesses 19 and 20 by an inwardly directed radial force exerted by the end convolutions 15 and 16, which are in a distorted condition with an increased arc radius equal to that of the groove 12, in order that they might lie flush with or below the surface of the male connecting member 10. The distance between the recesses 19 and 20, along the longitudinal axis of the male connecting member 10, is such that in order to position the tangs 17 and 18 in their respective recesses 19 and 20, it is necessary to apply tension to the spring 13 along its longitudinal axis which places the spring under radial compression. This keeps the spring snugly seated in the grooves of the male member until released.

The connecting member 11 has an internal spiral groove 21 therein which has the same pitch as that of the grooves 12 and 14 on the member 10 and is of a depth that is less than the diameter of the spring wire so that upon the joining of the members 10 and 11 and the resultant release and radial expansion of the coil connector spring 13, the members are locked together by the spring contacting the respective members and lying in grooves 14 and 21 (Fig. 3).

Figure 5:
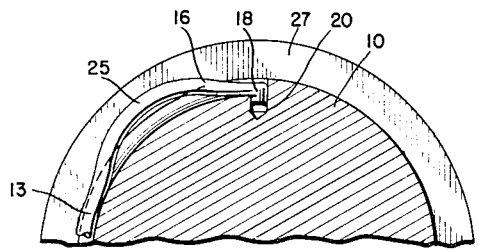
Fig. 5 is a fragmentary cross-sectional view taken along a line substantially corresponding to line 5—5 of Fig. 1 and showing a portion of the coil spring connector locked in position on the male member as it appears before connection with a mating member.
Figure 6:
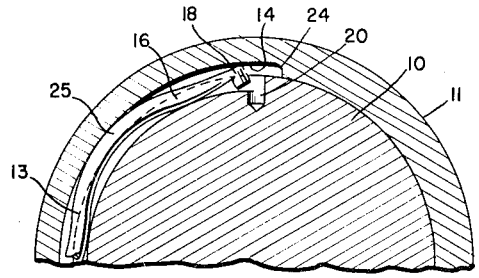
Fig. 6 is a changed position view similar to Fig. 5 taken along a line substantially corresponding to line 6—6 of Fig. 2 and showing a portion of the coil spring connector as it appears after the connection of the mating members.

The loaded spring 13 is released to expand radially by the withdrawal of tang 18 from its recess 20. The tang 18 is withdrawn by pressure being exerted upon a deformed portion 25 of the last convolution 16 which extends above the outer surface of male member 10 when the spring 13 is loaded on the member (Fig. 5). In the embodiment shown, pressure is applied to the deformed portion 25 by a beveled leading edge 26 of the female member 11 when the members 10 and 11 are joined. The leading edge 26 contacts the deformed portion 25 and forces it into the groove 12 of the male member 10, whereupon the tang 18 is raised from the recess 20 thus conditioning the spring to expand radially. The members 10 and 11 are then urged together until the leading edge of the female member contacts a shoulder 27 on the male member and the members are twisted relatively to each other until the grooves 12 and 21 are in registry throughout their length, whereupon the spring 13 expands into the groove 21 to hold the members together (Figs. 2 and 6). In this hold position the possibility exists of the spring 13 being forced back into the groove 12 by the application of an external force tending to separate the members 10 and 11. It is appreciated that under some circumstances movement of the spring 13 could be affected by a faulty seating of the spring within the groove 21 of the female member in which case a force tending to separate the members might be translated into two vector components, one directed radially and the other longitudinally of the axis of the connector spring 13. The radial force might cause the spring 13 to be compressed and fully retracted into the groove 12 of the male member 10 and possibly completely retracted from the groove 21 of the female member whereupon an uncoupling of the members would be effected. In the present embodiment this possibility may be avoided by rotating the member 10 in a clockwise direction in relation to member 11 after the initial hold position has been attained (Fig. 2) whereby the shallow groove 14 will be moved under spring 13 thus causing the spring to ride up into and be seated in shallow groove 14 (Fig. 3). In this locked position the separation of the members 10 and 11, due to any force tending to pull them apart, such as setback forces present when a projectile or rocket is fired, is prevented.

The depth of groove 14 being less than the diameter of the spring wire 13 prevents the wire from withdrawing wholly from the member 11 regardless of the degree of force applied, therefore, because of this unique construction of the elements of the connector, it is impossible to separate the members 10 and 11 once they have been assembled in a locked position (Fig. 3). Also any rotating motion causes tang 18 of the spring 13 to abut an end 24 of the groove 14, and since tang 17 remains within the recess 19, any further movement of the members will result in the lineal compression and further radial expansion of the spring which increases the friction between the groove 21 and the spring to prevent further relative movement between the members 10 and 11, and hence, thereby preventing separation of the members.

In view of the above disclosure, another embodiment becomes readily apparent to those skilled in the art. In this variation, the grooves in the male and female members may be shallow and deep respectively instead of deep and shallow as shown. The spring is then reversed so that the tangs are directed outwardly and the deformed portion extends inwardly. This inversion is readily visualized without illustration, for the elements, except for the basic connecting members are reversed. The spring is held in radial tension within the female member to be radially compressed upon contact of the members and thereby engage the grooves of the male member to lock the members together.

In some instances the provision of a permanent lock between the members may be undesirable; therefore in Fig. 7 there is disclosed a modification of the invention wherein a male connecting member 40 is provided having features which permit its ready disconnection from a mating member. The male member 40 is provided with a pair of adjacent spiral grooves 41 and 42, similar to grooves 12 and 14 disclosed in the embodiment of Fig. 1, but which extend the entire length of the member. In this modification the groove 41 is of sufficient depth to accommodate a helical or spiral coiled connector spring 43 similar in configuration to that disclosed in Fig. 4 and in a manner described in conjunction with the previous embodiment of this invention. The spring 43 has a first convolution which terminates in a tang 44 which is weakened by notches 45 or 46, or both, at the point where it joins the spring (Fig. 9), so that when the member 40 is assembled with its mating member (not shown) as described above, a twist of predetermined force will snap the tang 44 and permit the member to be disassembled in a manner similar to the unscrewing of conventional threads. The spring 43 which remains within the female connecting member may be removed by the use of a compression tool or any other suitable means.

It will be apparent that this modification may be applied to the female member by extending the grooves in the female member 11, in the same manner as shown on the male member 40 in Fig. 7, and thus permit the members to be separated in the conventional manner without the necessity of rupturing the tang 17.

In Fig. 8 there is disclosed a machine screw 50 which is shown connected with a tapped plate 51 or any other type of internally threaded member to cooperate therewith in maintaining another plate 52 fixed relatively thereto. The screw 50 and the plate 51 are provided with helical grooves similar to those of connecting members 20 and 21 respectively, and are connected in the manner described above in the first embodiment of the invention shown in Figs. 1, 2 and 3.

Referring again to the first embodiment and assuming the male and female members are of the type which are stored separately to be assembled just prior to use, the male member is provided, at the time of manufacture, with the hereinbefore described grooves and the spring 13 is assembled within the groove 12 of the male member 10 by expanding the end convolutions 15 and 16 sufficiently to permit the spring to slide over the exterior surface of the male member until the tang 17 registers with its recess 19. Releasing the convolution 15 permits the tang 17 to engage the recess 19 by the convolutions natural resiliency. The spring 13 may then be worked into and along the groove 12 until the tang 18 registers with its recess 20; the tang naturally seating therein because of the reduced diameter of the last convolution 16. Thus, the spring 13 will be retained locked in a tensioned condition in the groove 12, and the male, and female members may be quickly assembled at some future time by the simple process of sliding them together until the deformed portion 25 of the spring 13 is depressed by the beveled leading edge 26 of the female member to disengage the tang 18 from recess 20 and permit the spring 13 to expand radially into the groove 21 of the female member when the groove 12 has been properly registered therewith. The members 10 and 11 are thereafter locked by further rotating them relatively to each other to cause the spring 13 to ride up and be seated in groove 14 of the male member.

Obviously many modifications and variations of the present invention are possible in the light of the above teachings. It is therefore to be understood that within the scope of the appended claims the invention may be practiced otherwise than as specifically described.

What is claimed is:

1. In a connector assembly, a male member and a female member, both said members having substantially cylindrical surfaces for relatively close telescopic engagement, one of said members having coextensive first and second helical grooves, said second groove having a depth less than said first groove and communicating throughout its length with the first groove, said other member having a groove formed therein, said first groove being in substantial registry throughout its length with the groove of the other member when the first and second members are in telescopic engagement, a spring mounted in said first groove, means for releasably retaining said spring in tension in the first groove, said spring being adapted to move against said other member when released from tension, said first groove being of a depth to substantially contain the whole of said spring and the groove in the said other member being of a depth materially less than the cross section of the spring, means to release the spring from tension to cause it to move into the groove of the said other member upon assembly of the members, relative rotation of the members effecting movement of said first groove out of apposition with the spring and said second groove into apposition with the spring to effectively lock said members against separation.

2. In a connector assembly, a male member and a female member, both said members having substantially cylindrical surfaces for relatively close telescopic engagement, one of said members having coextensive first and second helical grooves, said second groove being adjacent to and communicating throughout its entire length with said first groove, said other member having a helical groove formed therein, said first groove being in substantial registry throughout its length with the groove of the other member when said members are in full telescopic engagement, a resilient spring mounted in said first groove, means for releasably maintaining the spring in tension in the groove, said spring being adapted to move against said other member when released from tension, said first groove being of a depth sufficient to contain the whole of said spring and said second groove being of a depth less than the cross section of the spring whereby a portion of the spring protrudes to perform a locking function, the groove in the other member being of a depth less than the cross section of the spring, said member having the first groove with said spring mounted therein being freely slidable into telescopic engagement with said other member, means to release the retaining means to permit the resilient spring to move into the groove of the other member upon assembly of the members, relative rotation of said members effecting movement of said first groove out of apposition with the spring and said second groove into apposition with the spring to effectively lock said members against separation.

3. In a connector assembly, a male member, a female member, both of said members having substantially cylindrical surfaces for relatively close telescopic engagement, one of said members having both a first helical groove and a second helical groove coextensive with one another, said second groove being adjacent to and opening along one side thereof and throughout its length into said first groove, said other member having a groove formed therein, said first groove being in substantial registry throughout its length with the groove of the other member when said members are in telescopic engagement, a resilient spring mounted in said first groove and having tangs formed on the opposite ends thereof to releasably retain the spring therein in tension, said spring being adapted to move against said other member when released from its tensioned position, said first groove receiving the spring being of a depth to substantially contain the whole of said spring and having tang receiving recesses therein, said second groove being of a depth less than the cross section of the spring whereby a portion of the spring protrudes to perform a locking function, the groove in the other member being of a depth less than the cross section of the spring, said spring having a deformed portion adjacent one end thereof which projects from the first groove when the spring is mounted therein to contact the other member during assembly to disengage a tang from its recess and thereby permit movement of the spring into the other groove, upon relative rotation of said members said first groove being moved out of apposition with the spring and said second groove being moved into apposition with the spring to effectively lock said members against separation.

4. In a connector assembly, a male member, a female member, both of said members having substantially cylindrical surfaces for relatively close telescopic engagement, one of said members having both a first helical groove and a second helical groove coextensive with one another, said second groove being adjacent to and opened along one side thereof and throughout its length to said first groove, said other member having a helical groove therein, said first groove being in substantial registry with the groove of the other member when said members are in telescopic engagement, a spring mounted in said first groove and having tangs formed on opposite ends thereof for releasably retaining the spring therein in tension, said spring being adapted to move radially away from the bottom of the first groove when released from tension, said first groove receiving the spring being of a depth to substantially contain the whole of said spring and having tang receiving recesses therein, said second groove being of a depth less than the cross section of the spring whereby a portion of the spring protrudes to perform a locking function, the groove in the other member being of a depth less than the cross section of the spring, means to release a tang from its recess to cause the spring to move into the groove in the other member upon assembly of the members, and upon relative rotation of the members said first groove being moved out of apposition with the spring and said second groove being moved into apposition with the spring to effectively lock said members against separation.

5. In a connector assembly, a male member, a female member, both of said members having substantially cylindrical surfaces for relatively close telescopic engagement, said male member having both a first helical groove and a second helical groove coextensive with one another, said second groove communicating along one side thereof and throughout its entire length with said first groove, said second member having a helical groove therein, said first groove of said first member and said groove of said second member being in substantial registry with one another throughout their respective lengths during assembly of the members, a spring mounted in said first groove, means for releasably retaining the spring in tension in the first groove, said spring being adapted to move toward the second member when released from tension, said first groove being of a depth to substantially contain the whole of said spring, said second groove being of a depth less than the cross section of the spring whereby a portion of the spring protrudes to perform a locking function, the groove in the second member being of a depth less than the cross section of the spring, said first member with said spring thereon being freely slidable into telescopic engagement with said second member, means to release the spring to cause it to move into the groove of the second member upon assembly of the members, and upon relative rotation of said members said first groove being moved out of apposition with the spring and said second groove being moved into apposition with the spring to effectively lock said members against separation.

6. In a connector assembly, a male member, a female member, both of said members having substantially cylindrical surfaces for relatively close telescopic engagement, one of said members having both a first helical groove and a second helical groove coextensive with one another, said second groove being open along one side thereof and throughout its length to said first groove, said first and second groove terminating short of the leading edge of said member, said other member having a helical groove therein, said first groove of one of the members and said groove of the other member being in substantial registry with one another throughout their respective lengths when said members are connected in full telescopic engagement, a spring mounted in said first groove, means for releasably maintaining the spring in tension in the first groove, said spring being helically formed so that it moves away from the groove when released from tension, said first groove being of a depth to substantially contain the whole of said spring and said second groove being of a depth less than the cross section of the spring whereby a portion of the spring protrudes to perform a locking function, the groove in the other member being of a depth materially less than the cross section of the spring, means to release the spring to cause it to move into the other groove upon assembly of the members, and upon relative rotation of the members said first groove being moved out of apposition with the spring and said second groove being moved into apposition with the spring to effectively lock said members against separation.

7. In a connector assembly comprising a first member, a second member, both of said members having substantially cylindrical surfaces for relatively close telescopic engagement, said first member having contiguous coextensive helical grooves of different bottom diameters, said grooves opening into one another throughout their respective lengths, said second member having a single helical groove formed therein juxtaposed with relation to the grooves in said first member, a helical spring mounted on said first member in one of said grooves and having inwardly projecting tangs at the spring ends and an offset portion spaced selectively from one of the tangs for releasably maintaining the spring in tension in the groove, said spring being adapted to move against said second member when released from tension, the first helical groove in the first member being of a depth substantially equivalent to the spring cross section to contain completely said spring and having tang receiving recesses therein for subjecting the spring to tension loading, the second groove in the first member being of a depth less than the spring cross section, said first member with the spring in said first groove being freely slidable axially into relatively close telescopic engagement with said second member, camming means on said second member to engage the spring offset portion after substantially complete engagement of this first member and second member to disengage one of said tangs from its recess thereby releasing the spring to move into the groove on the second member, and upon relative rotation of said members said first groove being moved out of apposition with the spring and said second groove being moved into apposition with the spring to effectively lock said members against separation.

8. In a connector assembly comprising, a first member, a second member, both the first member and the second member having substantially cylindrical surfaces for relatively close telescopic engagement, the first member having adjacent coextensive helical grooves of different depths communicating with one another throughout their respective lengths and being axially displaced from each other, the second member having a single helical groove therein, the deeper one of the helical grooves of the first member and the single helical groove of the second member being in substantial registry with one another throughout their respective lengths when the members are in full telescopic engagement, a spring having retaining means at the spring ends to releasably maintain the spring in tension and to prevent endwise movement, and offset portion spaced selectively from the retaining means, said spring being positioned in tension by said retaining means within one of said grooves on said first member, said spring being so formed that it moves against the second member when released from tension, said first member with said spring thereon being freely slidable into telescopic engagement with said second member, camming means on said second member to engage the spring offset portion upon substantially complete telescop engagement of the first member and the second member to move the spring radially thereby releasing the spring from within its entrenched position within the groove in said first member to engage the groove on said second member, and upon relative rotation of said members said groove in said first member having the spring positioned therein being moved out of apposition with the spring and said other groove in the first member being moved into apposition with the spring to effectively lock said members against separation.

References Cited in the file of this patent

UNITED STATES PATENTS

| 1,946,860 | Kielland | Feb. 13, 1934 |
| 2,418,418 | Martin et al. | Apr. 1, 1947 |

FOREIGN PATENTS

| 408,608 | Great Britain | Apr. 11, 1934 |
| 563,437 | Great Britain | Aug. 15, 1944 |
| 681,811 | France | Feb. 4, 1930 |